(12) United States Patent
Holcombe

(10) Patent No.: US 8,278,363 B2
(45) Date of Patent: Oct. 2, 2012

(54) FISCHER-TROPSCH REACTIONS USING HEAT TRANSFER TUBES WITH A CATALYST LAYER ON THE OUTSIDE SURFACES

(76) Inventor: Thomas Charles Holcombe, Hillsborough, NJ (US)

( * ) Notice: Subject to any disclaimer, the term of this patent is extended or adjusted under 35 U.S.C. 154(b) by 242 days.

(21) Appl. No.: 12/728,230

(22) Filed: Mar. 21, 2010

(65) Prior Publication Data
US 2010/0240780 A1    Sep. 23, 2010

Related U.S. Application Data

(60) Provisional application No. 61/210,804, filed on Mar. 23, 2009.

(51) Int. Cl.
    C07C 27/00    (2006.01)
(52) U.S. Cl. .................... 518/700; 518/715
(58) Field of Classification Search .......... 518/700, 518/715
    See application file for complete search history.

(56) References Cited

U.S. PATENT DOCUMENTS

| | | |
|---|---|---|
| 1,872,956 A | 8/1932 | Jaeger |
| 2,051,774 A | 8/1936 | Kleinschmidt |
| 2,198,795 A | 4/1940 | Titlestad |
| 2,778,610 A | 1/1957 | Bruegger |
| 3,441,381 A | 4/1969 | Keith |
| 3,825,501 A | 7/1974 | Muenger |
| 3,868,393 A | 2/1975 | Reuter |
| 4,214,867 A | 7/1980 | Hunter |
| 4,288,346 A | 9/1981 | Hunter |
| 4,420,462 A | 12/1983 | Clyde |
| 4,571,325 A | 2/1986 | Nikolov |
| 4,903,755 A | 2/1990 | Michelfelder |
| 5,447,693 A | 9/1995 | Ohta |
| 5,520,891 A | 5/1996 | Lee |
| 5,997,831 A | 12/1999 | Dettling |
| 6,060,524 A | 5/2000 | Casanave |
| 6,174,159 B1 | 1/2001 | Smith |

(Continued)

FOREIGN PATENT DOCUMENTS
EP      1290109 B1    9/2004

(Continued)

OTHER PUBLICATIONS

Liu et al., Multi-scale engineered fixed bed reactor for enhancement of F-T reaction process performance (Proceedings of the International Technical Conference on Coal Utilization & Fuel Systems (2008), 33rd (vol. 2), 1027-1036.*

(Continued)

*Primary Examiner* — Jafar Parsa
(74) *Attorney, Agent, or Firm* — Richard D. Stone

(57) ABSTRACT

A method of converting synthesis gas into Fischer-Tropsch products comprises: (a) charging synthesis gas to a reactor comprising a shell, having an inlet nozzle near one end for receiving synthesis gas and an outlet nozzle near the opposite end for discharging products, with a plurality of heat transfer tubes inside the shell, having associated therewith means to pass heat transfer fluids through the inside of said heat transfer tubes to remove heat, and whereby the outside surfaces of said tubes have a layer of Fischer-Tropsch catalyst, (b) converting exothermically on said catalyst layer at least a portion of said synthesis gas to produce heat and Fischer-Tropsch products, (c) removing heat from said catalyst layer by passage of a heat transfer fluid through the inside of said tubes, and (d) recovering Fischer-Tropsch products from said reactor.

12 Claims, 3 Drawing Sheets

U.S. PATENT DOCUMENTS

| | | |
|---|---|---|
| 6,211,255 B1 | 4/2001 | Schanke |
| 6,228,341 B1 | 5/2001 | Hebert |
| 6,262,131 B1 | 7/2001 | Arcuri |
| 6,318,456 B1 | 11/2001 | Brenner |
| 6,491,880 B1 | 12/2002 | Wang |
| 6,797,243 B2 | 9/2004 | Arcuri |
| 6,855,272 B2 | 2/2005 | Burlingame |
| 6,855,737 B2 | 2/2005 | Newton |
| 7,084,180 B2 | 8/2006 | Wang |
| 7,115,670 B2 | 10/2006 | Hensman |
| 7,210,469 B1 | 5/2007 | Saele |
| 7,220,390 B2 | 5/2007 | Tonkovich |
| 7,223,373 B2 | 5/2007 | Maude |
| 7,608,227 B2 | 10/2009 | West |
| 2004/0102530 A1 | 5/2004 | Borsa |
| 2004/0148862 A1 | 8/2004 | Yu |
| 2005/0203195 A1 | 9/2005 | Wang |
| 2007/0009426 A1 | 1/2007 | Leveson |
| 2009/0258259 A1 | 10/2009 | Leshchiner |

FOREIGN PATENT DOCUMENTS

| | | |
|---|---|---|
| EP | 1625887 A1 | 2/2006 |
| WO | WO 98/04342 * | 2/1998 |

OTHER PUBLICATIONS

Steynberg, Fischer-Tropsch Technology, 2004, pp. 64-77, Elsevier.

Deckwer, Bubble Column Reactors, 1991, pp. 1-5, John Wiley & Sons, New York.

Heck, Catalytic Air Pollution Control, 2002, pp. 6, 19, 294, 337, 376, 2nd edition, Wiley-Interscience, New York.

Green, Perry's Chemical Engineer's Handbook, 2007, pp. 11-33 to 11-46, 8th edition, McGraw-Hill Professional Publishing, New York.

Seo, "The Catalytic Heat Exchanger Using Catalytic Fin Tubes", Chemical Engineering Science, Jan. 2003, p. 43, vol. 58, Issue 1, Elsevier.

Senkan, "Analysis and Design of Catalyst-Coated Fins/Spines", Ind. Eng. Chem. Process Des. Dev., 1980, pp. 680, vol. 19, Issue 4, American Chemical Society Publications.

* cited by examiner

FISCHER-TROPSCH REACTIONS USING HEAT TRANSFER TUBES WITH A CATALYST LAYER ON THE OUTSIDE SURFACES

CROSS-REFERENCE TO RELATED APPLICATIONS

This application claims the benefit of provisional patent application U.S. 61/210,804 filed on Mar. 23, 2009 by the present inventor, which is incorporated by reference.

BACKGROUND

Prior Art

The following is a tabulation of some prior art that presently appears relevant:

U.S. Patents

| Patent Nr | Issue Date | Patentee |
|---|---|---|
| 2,198,795 | 1940 Apr. 30 | Titlestad |
| 3,868,393 | 1975 Feb. 25 | Reuter et al |
| 4,571,325 | 1986 Feb. 18 | Nikolov et al |
| 6,318,456 | 2001 Nov. 20 | Brenner et al |
| 6,797,243 | 2004 Sep. 28 | Arcuri et al |
| 7,084,180 | 2006 Aug. 01 | Wang et al |
| 7,608,227 | 2009 Oct. 27 | West |

U.S. Patent Application Publication

| Publication Nr | Publ. Date | Applicant |
|---|---|---|
| 2004/0102530 | 2004 May 27 | Borsa et al |
| 2005/0203195 | 2005 Sep. 15 | Wang et al |

NONPATENT REFERENCES

*Catalytic Air Pollution Control*, Ronald M. Heck et al (eds.), 2$^{nd}$ ed. Wiley-Interscience (2002).
*Fischer-Tropsch Technology*, Andre Steynberg and Mark Dry (eds.), Elsevier (2004).
*Perry's Chemical Engineer's Handbook*, 8$^{th}$ ed., Donald W. Green and Robert H. Perry (eds.), McGraw-Hill Professional Publishing (2007).
W.-D. Deckwer, *Bubble Column Reactors*, John Wiley & Sons (1991).
Industrial catalyst coaters
    BASF Corporation (basf.com)
    Johnson Matthey (matthey.com)
    Umicore Group (umicore.com)
    Aristo Catalysts (aristoglobal.com)

PRIOR ART DISCUSSION

The Fischer-Tropsch reactions involve converting a synthesis gas, comprised mainly of H2 and CO, in the presence of a catalyst to aliphatic hydrocarbon products. The reactant composition may comprise the product stream from another reaction process such as steam reforming, partial oxidation, autothermal reforming, CO2 reforming, coal gasification, and combinations thereof. The aliphatic hydrocarbon products may range from methane to paraffinic waxes of up to 100 carbon atoms or more.

Fischer-Tropsch reactions are highly exothermic. The average heat released per —CH2- formed is about 145 kJ. It is difficult to remove heat from the catalyst fast enough to maintain optimum catalyst operating temperatures. Large variations in catalyst operating temperatures result in poor catalytic performance, such as high methane formation, reduced selectivity for heavy hydrocarbons, reduced conversions per pass, poor catalyst utilization and rapid catalyst deactivation.

Typical commercial Fischer-Tropsch reactors are described in *Fischer-Tropsch Technology*, Andre Steynberg and Mark Dry (eds.), Elsevier (2004), p. 164.

One common approach is to place fixed catalyst beds inside of heat transfer tubes, such as described in U.S. Pat. No. 6,797,243 (2004) to Arcuri and U.S. patent application publication 2004/0102530 to Borsa. Synthesis gas passes through the inside of the tubes and reacts as it comes in contact with the catalyst particles. Boiling water is typically used on the outside of the tubes to remove the heat of reaction. Steam produced by the heat of reaction is removed from the reactors and used for heating purposes or to drive a steam turbine.

Reactors based on fixed catalyst beds must balance flow velocity, pressure drop and temperature differentials in order to achieve reasonable commercial Fischer-Tropsch performance. Catalyst particles must be less than 200 microns in order to achieve very high productivity and very low methane formation. However, in commercial operations it is impractical to use particles this small in packed beds due to excessively high pressure drops. Particle sizes in the range of ⅟64 to ⅛ inch (400 to 3200 microns) are typically used, thereby causing reduced productivity and high methane formation. Tube diameters are typically 2 to 3 inches. Due to the high heat release and relatively low mass velocity, there is typically a high radial temperature profile across the packed catalyst beds. These uneven temperatures significantly promote methane formation, reduce the heavy hydrocarbon formation and increase the catalyst deactivation rate.

While not mentioning Fischer-Tropsch reactions, some researchers have described alternative approaches to handling highly exothermic reactions. One approach is to have a plurality of packed catalyst beds in sequence with inter-cooling (or inter-heating) between each bed, such as U.S. Pat. No. 2,198,795 (1938) to Titlestad. In another approach described in U.S. Pat. No. 4,571,325 (1986) to Nikolov, a reactor uses tubes to form alternating "contact regions" and heat exchanger regions, wherein the "tube means" of the contact regions are coated on the outer surfaces with catalyst and the "tube means" of the heat exchange regions are devoid of catalyst. The fundamental disadvantage of these approaches when applied to highly exothermic reactions is that the temperature of the catalyst increases from the inlet to the outlet of each catalyst bed (or "contact regions"), thereby preventing good temperature control of the catalyst.

In another approach not focused on Fischer-Tropsch reactions, U.S. Pat. No. 3,868,393 (1975) to Reuter describes a process for the manufacture of a carboxylic acid whereby a reactor contains heat transfer tubes in which a portion of the internal surfaces of the heat transfer tubes are coated with catalyst. This approach has disadvantages in that the catalyst volume relative to the volume of fluid flow is relatively low and manufacture of the coated tubes is difficult.

To address some of the disadvantages discussed above, another common approach used for Fischer-Tropsch reactions is a three-phase slurry bubble column reactor ("slurry reactor"). Small Fischer-Tropsch catalyst particles are suspended in a slurry reactor that is nearly full of Fischer-Tropsch liquid product. Synthesis gas is fed into the reactor near the bottom and the gas bubbles that form gradually rise through the reactor liquid due to density differences. The carbon monoxide and hydrogen dissolve in the liquid and react as they make contact with the suspended catalyst particles. Gas that reaches the top of the slurry reactor is removed. As Fischer-Tropsch liquid products are formed, slurry is removed from the reactor to maintain a fairly constant slurry level in the slurry reactor. Boiling water inside of heat transfer tubes is typically used in slurry reactors to remove the heat of reaction.

The motion of the liquid facilitates heat transfer. The small suspended catalyst particles are moving within a liquid continuous phase, which aids in transfer of heat from the catalyst particles to the cooling surfaces of the heat transfer tubes. Relatively long residence times are required to produce long-chain Fischer-Tropsch hydrocarbons, such as diesel fuel and wax. Since bubbles tend to rise rather quickly through a liquid due to the difference between the density of the gas and the slurry, commercial slurry reactors must be very tall, typically over 100 feet high, to achieve adequate residence times.

Slurry reactors do not provide very good control of the catalyst temperatures. Because the reactors are very tall, they are also very heavy and difficult to modularize or transport. The small suspended catalyst particles experience significant attrition as the particles move and collide. When liquid product is removed from a slurry reactor, it is difficult and expensive to remove the small catalyst particles and dust from the liquid. A more detailed description of three-phase slurry bubble column reactors is given in W.-D. Deckwer, *Bubble Column Reactors*, John Wiley & Sons (1991).

Some work in recent years has focused on improving catalyst temperature control by utilizing reactors in which the distances between the catalyst and the heat transfer fluid are reduced, typically to less than 1 centimeter. One approach is the use of reactors containing microchannels, for example U.S. Pat. No. 7,084,180 (2006) to Wang. In U.S. patent application 2005/0203195, Wang describes a microchannel reactor in which Fischer-Tropsch yields are improved by using a catalyst surface layer with a thickness of 35 microns or less.

Another approach is to use plate and fin heat exchangers in which catalyst if applied onto a substrate between the plates, for example U.S. Pat. No. 7,608,227 (2009) to West. Still another approach is the use of a crosscurrent type of heat exchanger in which the plates that form the reaction ducts are provided with a catalyst coating, as described in U.S. Pat. No. 6,318,456 (2001) to Brenner (claim 31).

These reactors wherein the distance between the catalyst and the heart transfer fluid is typically less than 1 centimeter have the potential to achieve much tighter catalyst temperature control, with temperature variations typically less than 2-5 degrees Centigrade, thereby improving catalytic performance. However, using narrow passageways restricts the quantity of catalyst that can be utilized within a given reactor volume and results in high pressure drops as the synthesis gas and Fischer-Tropsch products pass through the narrow passageways. These reactors also require sophisticated and somewhat expensive fabrication techniques and field servicing is complicated because of the narrow passageways involved.

There is a need for a simple, robust approach, which will provide very tight temperature control while being easy to fabricate and service. Applying a thin layer of Fischer-Tropsch catalyst to the outside surfaces of heat transfer tubes allow small distances between the catalyst and heat transfer fluid and excellent catalyst temperature control while ensuring low pressure drops, simple fabrication and easy service.

BRIEF SUMMARY OF THE INVENTION

Accordingly, one embodiment provides a method of converting synthesis gas into Fischer-Tropsch products, comprising: (a) charging synthesis gas to a reactor comprising a shell, having an inlet nozzle near one end for receiving synthesis gas and an outlet nozzle near the opposite end for discharging products, with a plurality of heat transfer tubes inside the shell, having associated therewith means to pass heat transfer fluids through the inside of said heat transfer tubes to remove heat, and whereby the outside surfaces of said tubes have a layer of Fischer-Tropsch catalyst, (b) converting exothermically on said catalyst layer at least a portion of said synthesis gas to produce heat and Fischer-Tropsch products, (c) removing heat from said catalyst layer by passage of a heat transfer fluid through the inside of said tubes, and (d) recovering Fischer-Tropsch products from said reactor.

In another embodiment, the present invention provides a reactor for converting synthesis gas to Fischer-Tropsch products, comprising a shell, having an inlet nozzle near one end for receiving synthesis gas and an outlet nozzle near the opposite end for discharging products, with a plurality of heat transfer tubes inside the shell, having associated therewith means to pass heat transfer fluids through the inside of said heat transfer tubes to remove heat, and whereby the outside surfaces of said tubes have a layer of Fischer-Tropsch catalyst.

Several advantages of the new embodiments are as follows: Fischer-Tropsch reactions can be carried out using commonly available equipment, while achieving high heat transfer rates, small temperature differentials across the catalyst, short distances for fluid mass transfer to the active catalyst sites, high conversions and good catalyst utilization, continuous and rapid heat transfer, good control of catalyst temperatures, high flow rates at relatively low pressure drops, little catalyst attrition, easy catalyst installation and removal, and easy modularization and transportability. Furthermore, for applications requiring long gas residence times, reactors can be built that are short and light weight, without the need for high gas velocities or high gas recycle rates.

DRAWINGS—FIGURES

DRAWINGS—REFERENCE NUMERALS

FIG. 1.

| | |
|---|---|
| 1 compact finned-tube heat exchangers | 2 support frame |
| 3 inlet pipes | 4 outlet pipes |

| | |
|---|---|
| 5 inlet manifold piping | 6 outlet manifold piping |
| 7 shell of reactor | 8 inlet nozzle on shell |
| 9 gas outlet nozzles | 10 liquid product pump |
| 11 pool of liquid | 12 liquid outlet nozzle |
| 13 liquid level of pool | 14 recycle liquid nozzle |
| 15 heat transfer fluid nozzles | 16 spray head |
| 17 falling liquid | 22 synthesis gas |
| 23 gas product | 24 liquid product |

FIG. 2

| | |
|---|---|
| 18 heat transfer tubes | 19 fins |
| 20 headers | 21 nozzles on headers |

FIG. 3

| | |
|---|---|
| 1 heat transfer tubes | 2 heat exchanger shell |
| 3 inlet nozzle on shell | 4 baffles in shell |
| 5 outlet nozzle on shell | 6 tie rods and spacers |
| 7 gas/liquid separator | 8 liquid product pump |
| 9 inlet nozzle | 10 outlet nozzle |

DETAILED DESCRIPTION

Figure 1:
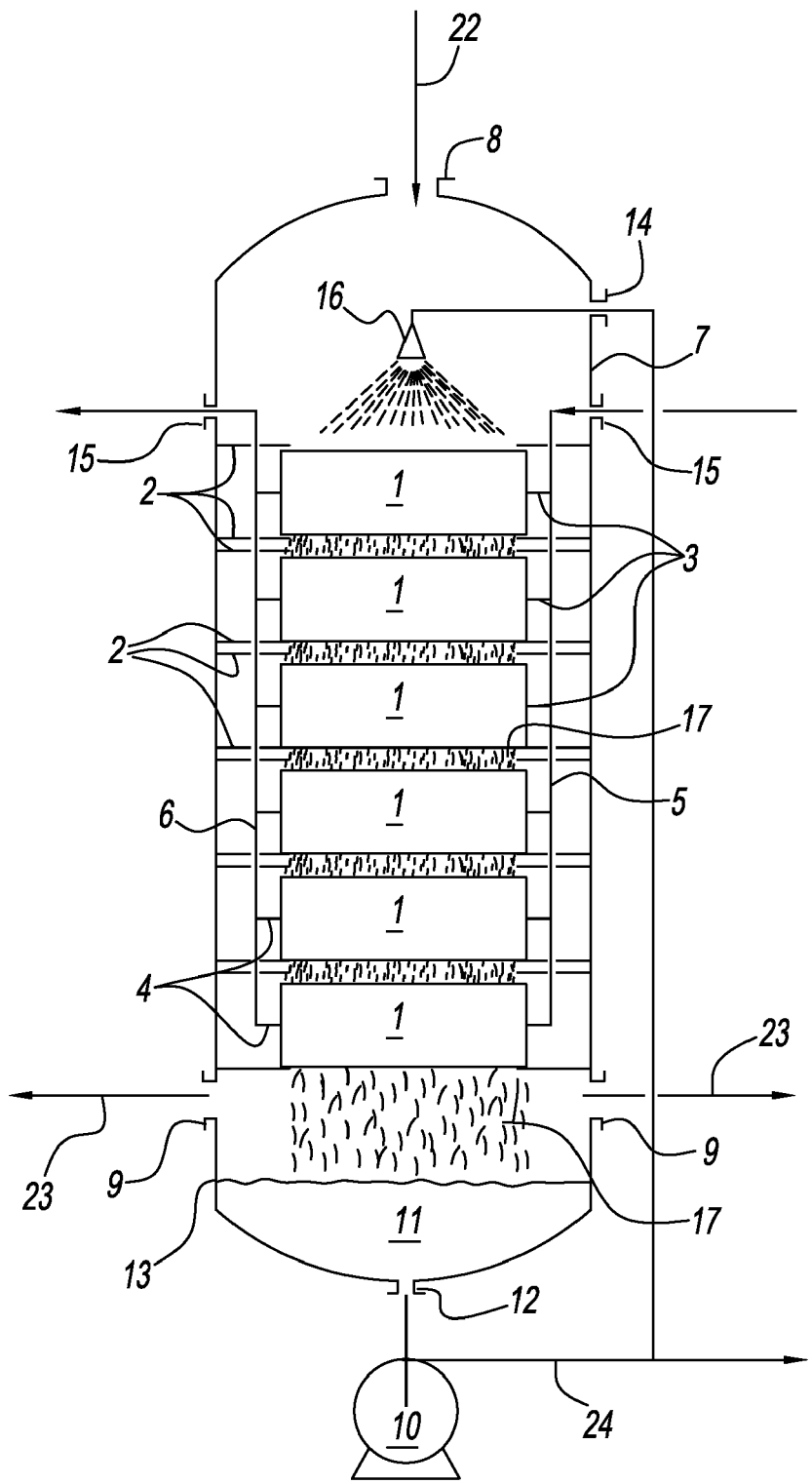
FIG. 1 is a simplified view of an embodiment of a Fischer-Tropsch reactor in which compact finned-tube heat exchangers are used as the source of heat transfer tubes.
Figure 2:
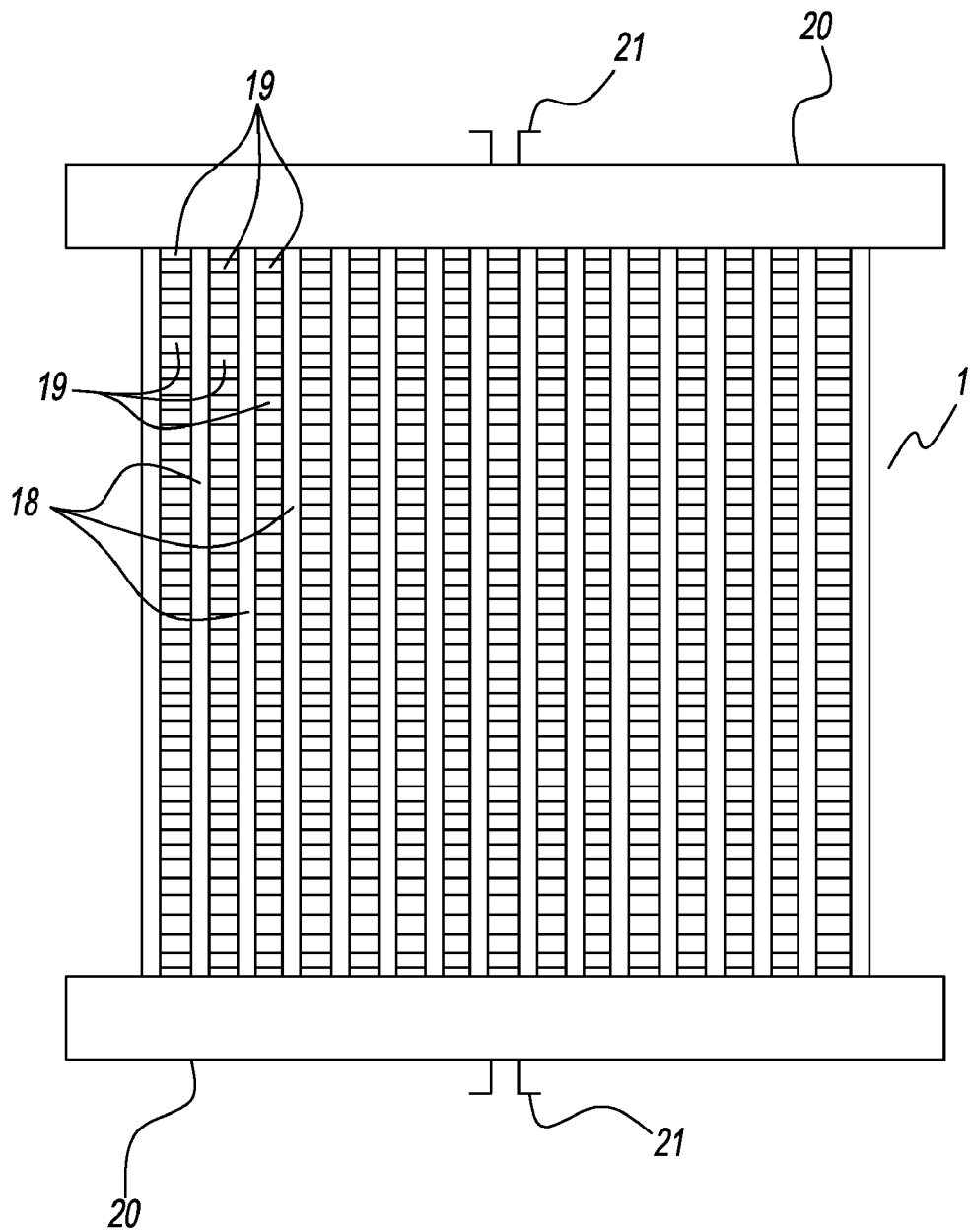
FIG. 2 is a simplified view of the face (open area) of one of the compact finned-tube heat exchangers.

First Embodiment—FIG. 1 & FIG. 2

FIG. 1 and FIG. 2 illustrate an embodiment of a process for carrying out highly exothermic Fischer-Tropsch reactions, whereby synthesis gas is partially converted to Fischer-Tropsch products. The process utilizes a reactor consisting of a shell 7, an inlet nozzle 8, two gas outlet nozzles 9, a liquid outlet nozzle 12, a recycle liquid nozzle 14 and two heat transfer fluid nozzles 15, and containing heat transfer tubes. A plurality of compact finned-tube heat exchangers 1 are utilized, such as the types used as radiators in automobiles, trucks or motorcycles. The outside surfaces of the heat transfer tubes and fins are covered with a thin layer of Fischer-Tropsch catalyst.

FIG. 2 illustrates the layout of one of the compact finned-tube heat exchangers 1, which consists of heat transfer tubes 18 and fins 19 coated with a thin layer of catalyst. The heat transfer fluid flows into and out of the heat transfer tubes via nozzles 21 and headers 20. In this embodiment, boiling water is used as the heat transfer fluid, although other fluids may also be used.

In this embodiment, the distance from the end of the fins to the tube walls is 1 centimeter. The spacing between the fins is 400 microns and the thickness of the catalyst layer is nominally 50 to 150 microns so that fluids may pass between the fins. The characteristics of the compact finned-tube heat exchangers can be varied to improve performance, such as fin length, fin spacing, catalyst layer thickness, heat transfer tube diameters, tube spacing, tube thickness, tube and fin surface roughness, percentage open area, overall heat exchanger length and width, and materials of construction.

For this embodiment, Co supported on $Al_2O_3$ is used as the Fischer-Tropsch catalyst. However, other active catalysts based on Fe or Ru or mixtures may also be used.

In the present embodiment, the method of applying the catalyst layer to each compact finned-tube heat exchanger is as follows: (a) the headers 20 and nozzles 21 are masked, (b) a paint sprayer is used to spray a water-catalyst slurry across one face of the heat exchanger, thereby coating the tubes and fins, (c) the heat exchanger is flipped and slurry is sprayed onto the opposite face of the heat exchanger, (d) an air blower is used to dry the catalyst coating, and (e) the radiator is heated to 400 degrees Centigrade for one hour.

Catalyst layers can be applied using a wide variety of industrial techniques, including spraying, painting, dipping, passing the tubes under a "water fall" of catalyst slurry, etc. Catalyst coatings on radiators, air conditioner condensers, etc. are discussed in Catalytic Air Pollution Control, Ronald M. Heck et al (eds.), $2^{nd}$ edition, Wiley-Interscience (2002), p. 376. BASF Corporation (basf.com), Johnson Matthey (matthey.com), Umicore Group (umicore.com) and Aristo Catalysts (aristoglobal.com) are a few of the industrial companies with extensive experience applying layers of catalyst to a wide variety of surfaces.

In order to improve adhesion and uniformity of thickness, it is sometimes advantageous to apply a layer of catalyst in two or more stages, with each catalyst coating being dried before adding the next. When this is done, the layer of catalyst actually consists of several coatings. In addition, it is sometimes advantageous to use different catalyst formulations for each layer or to use different catalyst formulations on different heat transfer tube surfaces. When this document refers to a layer of catalyst, it should be understood that a plurality of coatings or a plurality of catalyst formulations can be used to create the catalyst layer.

A plurality of the compact finned-tube heat exchangers 1 with catalyst coatings are stacked together with the open areas facing one another utilizing a support frame 2 to hold them in place. The support frame provides a small amount of separation. In some cases, baffles (not shown) are used between the compact finned-tube heat exchangers to control the patterns of fluid flow in the open space surrounding the heat exchangers. It is generally desirable to have a uniform flow rate across the face of the heat exchangers. The support frame 2 is also designed to minimize liquid and gas from flowing around the outer edges of the heat exchangers and thereby minimize bypassing the heat transfer tubes.

Inlet pipes 3 on all the compact finned-tube heat exchangers are connected together to create inlet manifold piping 5 through which heat transfer fluid enters the inside of the heat transfer tubes. Outlet pipes 4 on all the compact finned-tube heat exchangers are also connected together to create outlet manifold piping 6 through which heat transfer fluid leaves the inside of the heat transfer tubes. The support frame 2 has holes that allow passage of the inlet and outlet manifold piping 5, 6 while minimizing liquid and gas bypassing. The heat transfer fluid enters the reactor through one of the nozzles 15. The compact finned-tube heat exchangers and support frame are sealed inside the shell. A spray head 16 with piping is included inside the shell to spray recycled liquid above the topmost compact finned-tube heat exchanger.

Although it is preferred to operate with essentially all of the outer surfaces of the heat transfer tubes and fins coated with a layer catalyst, it is possible, with some loss of performance, for some of the outer surfaces of the heat transfer tubes to be uncoated. Preferably, at least 70% of the outer surfaces are coated. Ideally, the ratio of coated outer surfaces to uncoated outer surfaces is at least 5:1 or higher, with ratios of 10:1 or higher giving even better results.

Operation—FIG. 1 and FIG. 2

Synthesis gas 22 enters the reactor shell 7 through the inlet nozzle 8, passes downward through the open areas of all the compact finned-tube heat exchangers 1 in sequence, making contact with the catalyst layers on the heat transfer tubes 18 and fins 19 as it passes. In this embodiment, the reactor is operated at 430 degrees Fahrenheit and 20 atmospheres of pressure, although different conditions can be used.

Some liquid Fischer-Tropsch products are formed through reactions on the catalytic surfaces of the heat transfer tubes and fins and falls 17 from one compact finned-tube heat exchanger to the next, eventually entering the pool of liquid 11 at the bottom of the vessel. Gas product 23 leaves the shell through the two gas outlet nozzles 9. The liquid product pump 10 removes the Fischer-Tropsch liquid product through liquid outlet nozzle 12 and the liquid flow rate is controlled to maintain a fairly constant liquid level 13 below the lowest compact finned-tube heat exchanger 1 and the gas outlet nozzles 9.

A portion of the liquid product leaving the liquid product pump, preferably between 5 and 50%, is recycled with a pipe through recycle liquid nozzle 14 near the top of the shell and is sprayed above the topmost compact finned-tube heat exchanger using a spray head 16. The recycled liquid mixes with the gas and liquid flowing down through the reactor.

Heat transfer fluid is fed to the compact finned-tube heat exchangers through a nozzle 15, inlet manifold piping 5, and inlet pipes 3. It then passes through a nozzle 21 and header 20 on each of the compact finned-tube heat exchangers and enters the inside of the heat transfer tubes 18 to remove heat. The heat transfer fluid then leaves the tubes through a nozzle 21 and header 20 at the opposite end of each compact finned-tube heat exchanger and passes through outlet pipes 4 and outlet manifold piping 6. The flow rate, temperature and pressure of the heat transfer fluid are controlled to achieve the desired level of heat removal and catalyst temperatures. The differential pressure between the fluids on the outside and inside of the tubes is controlled within a range that avoids damage to the compact finned-tube heat exchangers, as dictated by the compact finned-tube heat exchangers' mechanical strength limits.

Other Embodiments—FIG. 1 and FIG. 2

Other embodiments can be described as variations of FIG. 1 and FIG. 2, as follows:

- Oil coolers, air conditioner condensers, Fin-Fan® tube bundles or other types of tubular heat exchangers are used to supply the heat transfer tubes.
- For larger diameter shells, compact finned-tube heat exchangers can be connected in parallel to form rows and these parallel heat exchanger rows can then be stacked together with their open areas facing one another, utilizing a support frame to hold them in place and to minimize liquid and gas from bypassing the heat transfer tubes.
- Independent manifold piping systems are used to join adjacent compact finned-tube heat exchangers into different sections so that the flow rates, temperatures and pressures of the heat transfer fluids passing into each of the sections may be independently controlled, thereby controlling the catalyst temperatures of each compact finned-tube heat exchanger section independently.
- The liquid product 24 is separated into fractions using distillation, absorption or some other method and a portion of one or more fractions is recycled to the recycle liquid nozzle 14.
- A portion of the liquid product is recycled into the reactor between adjacent compact finned-tube heat exchangers to control the flow rates and compositions of the fluids outside the heat exchangers.
- A portion of the gas product 23, preferably 10 to 70%, is recycled into the reactor above the uppermost compact finned-tube heat exchanger or between any adjacent heat exchangers to control the flow rates and compositions of the fluids outside the heat exchangers.
- A portion of the liquid falling 17 from any given compact finned-tube heat exchanger is allowed to bypass the remaining heat exchangers and enters into the pool of liquid 11 or is withdrawn from the reactor without entering the pool.
- Up to 20% of the catalyst in the reactor is not present on the outside surfaces of the heat transfer fluids, but is coated on other surfaces or is present as catalyst particles inside the reactor.

Figure 3:
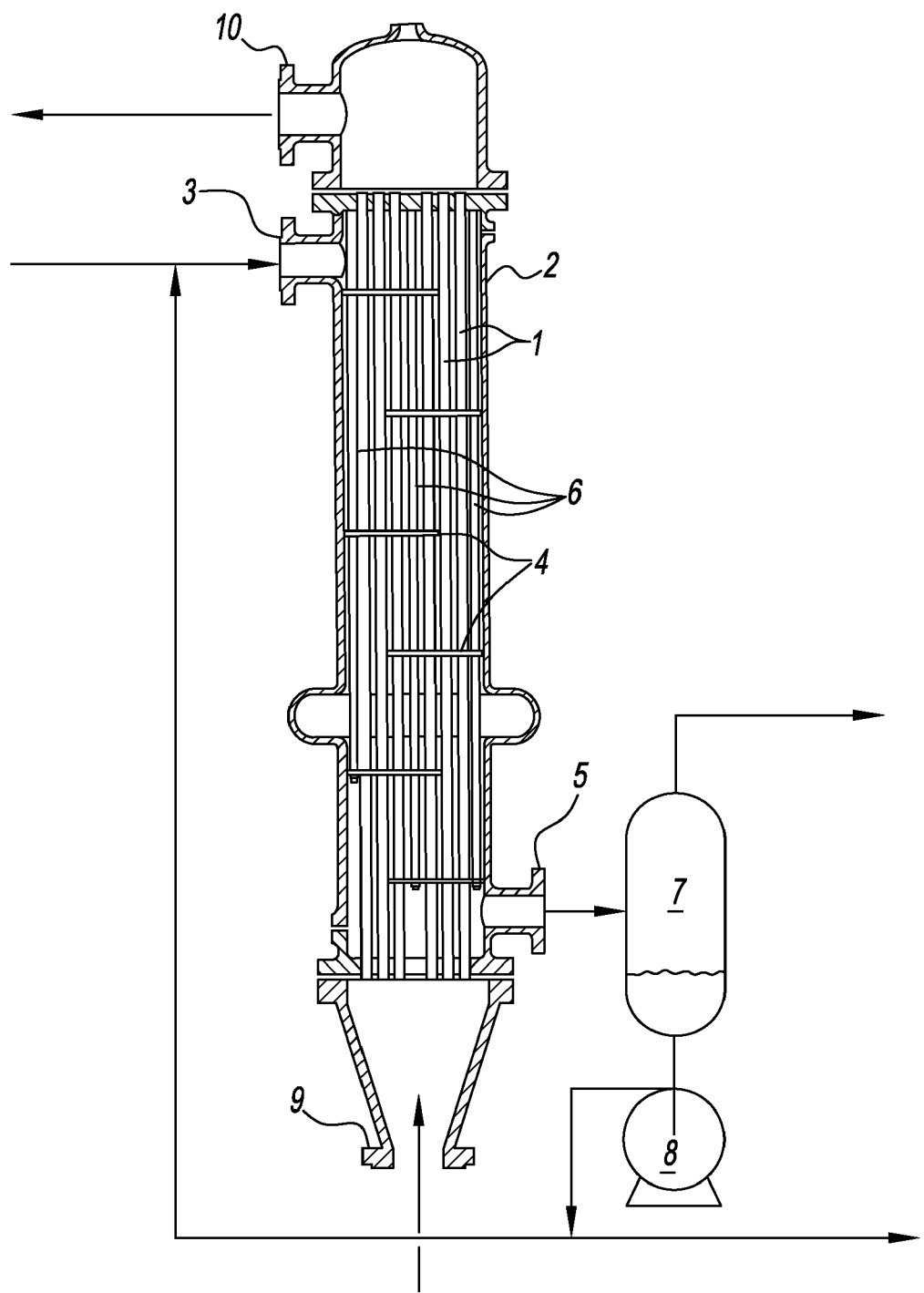
FIG. 3 is a simplified view of an embodiment in which a common shell-and-tube heat exchanger is modified for use as a Fischer-Tropsch reactor.

Additional Embodiment—FIG. 3

FIG. 3 illustrates another embodiment in which Fischer-Tropsch reactions are carried out in a common single-pass shell-and-tube heat exchanger. Various common shell-and-tube heat exchangers are described in detail in *Perry's Chemical Engineer's Handbook*, 8$^{th}$ Edition, Donald W. Green, Robert H. Perry (eds.), McGraw-Hill Professional Publishing (2007).

The shell-and-tube heat exchanger is mounted in a vertical orientation and consists of a shell 2, heat transfer tubes 1, a inlet nozzle 3, an outlet nozzle 5, nozzles for heat transfer fluid 9 & 10, tie rods and spacers 6 to hold the heat transfer tubes in place and baffles 4 to cause the fluids on the outside of the heat transfer tubes to move back and forth inside the shell as they move from the feed to the product end of the shell. A layer of Fischer-Tropsch catalyst is applied to the outside of the heat transfer tubes 1 before they are sealed inside the shell 2. Also shown is a gas/liquid separator 7 for separating the gas and liquid leaving the reactor via outlet nozzle 5 and a liquid product pump 8.

Operation—FIG. 3

Synthesis gas enters through inlet nozzle 3 and passes from side to side due to the baffles 4 as it moves down the shell 2. Gas and liquid produced by the Fischer-Tropsch catalytic reactions eventually reach the end of the shell and leave through exit nozzle 5. The product gas and liquid are separated in a separator vessel 7. A portion of the liquid is pumped with liquid product pump 8 and recycled to the feed gas and reenters the shell through the inlet nozzle 3. Heat transfer fluid is fed to the inside of the heat transfer tubes 1 via nozzle 9 and exits via nozzle 10. The flow rate, temperature and pressure of the heat transfer fluid are controlled to achieve the desired level of heat removal.

Other Embodiments—FIG. 3

Other embodiments can be described as variations of FIG. 3, as follows:

- The reactor is placed in a horizontal orientation or at an incline.
- The liquid product leaving the liquid product pump 8 is separated into fractions using distillation, absorption or some other method and a portion of one or more fractions is recycled to the inlet nozzle 3.
- A portion of the gas product leaving the gas/liquid separator 7 is recycled back into the reactor through the inlet nozzle 3.
- The shell-and-tube heat exchanger has a plurality of tube passes or a plurality of shell passes, or both.
- The heat transfer tubes 1 have fins, which also contain a layer of catalyst.
- Prior to adding a layer of catalyst to the outer surface of the heat transfer tubes, the outside surface area is modified by reducing the smoothness of the surface with grooves, indentations or small imperfections.
- The reactor consists of a plurality of shell-and-tube heat exchangers connected together in series or parallel.

Advantages

From the descriptions above, a number of advantages of some of the embodiments become evident:

- Use of a thin layer of catalyst (5 to 300 microns, preferably 25 to 200 microns) enables high heat transfer rates and small temperature differentials across the Fischer-Tropsch catalyst and between the catalyst and the heat transfer fluid.

Use of a thin layer of catalyst provides a short distance for fluid mass transfer to and from the active catalyst sites, thereby providing good catalyst utilization and low methane formation.

Continuous and rapid heat removal allows the temperature of the catalyst to be controlled more accurately, thereby providing better catalytic performance.

A high activity catalyst with a high heat flux or a narrow operating temperature window can be used to maximize catalytic performance.

The relatively large open area between the heat transfer tubes permits high gas and liquid flow rates while maintaining low pressure drops.

The layer of catalyst experiences none of the attrition associated with catalyst particles rubbing together.

It is easy to install and remove catalyst from the reactor by installing or removing the heat transfer tubes.

Reactors are easy to build using common industrial equipment.

Reactors are easy to modularize and transport.

For applications requiring long gas residence times, reactors can be built that are short and light weight, without the need for high gas velocities or high gas recycle rates.

The above embodiments might also be applied to other highly exothermic or endothermic catalytic reactions, such as many oxidation reactions, water-gas shift, C4-hydrocarbon conversion to maleic anhydride, steam methane reforming, etc.

Accordingly, the reader will see that the processes of the various embodiments allow synthesis gas to be converted to Fischer-Tropsch products while maintaining accurate control of the catalyst temperature and providing high catalytic performance. Furthermore, some the embodiments have additional advantages in that:

they enable high heat transfer rates and small temperature differentials across the catalyst;

they provide a short distance for fluid mass transfer to the active catalyst sites;

they provide continuous and rapid heat removal;

they enable use of a high activity catalyst with a high heat flux or a narrow operating temperature window;

they permit high gas and liquid flow rates while maintaining low pressure drops;

they experience none of the catalyst attrition associated with catalyst particles rubbing together;

they allow easy installation and removal of the catalyst from the reactor;

they are easy to build using common industrial equipment; and they can be built short and light weight so they are easy to modularize and transport.

Although the description above contains many specifics, these should not be construed as limiting the scope of the embodiments but as merely providing illustrations of some of several embodiments. Thus, the scope of the embodiments should be determined by the appended claims and their legal equivalents, rather than by the examples given. All references discussed are incorporated by reference.

I claim:

1. A method of converting synthesis gas into Fischer-Tropsch products, comprising: a. charging synthesis gas to a reactor comprising a shell, having an inlet nozzle near one end for receiving synthesis gas and an outlet nozzle near the opposite end for discharging products, with a plurality of heat transfer tubes inside the shell, having associated therewith means to pass heat transfer fluids through the inside of said heat transfer tubes to remove heat, and whereby the outside surfaces of said tubes have fins and a layer of cobalt containing Fischer-Tropsch catalyst on said tube outside surfaces and said fins, b. converting exothermically on said catalyst layer at least a portion of said synthesis gas to produce heat and Fischer-Tropsch products, c. removing heat from said catalyst layer by passage of a heat transfer fluid through the inside of said tubes, and d. recovering Fischer-Tropsch products from said reactor.

2. A method according to claim 1, wherein a plurality of catalysts is applied to the outside surfaces of the heat transfer tubes.

3. A method according to claim 1, wherein the nominal thickness of the layer of catalyst is between 25 and 200 microns.

4. A method according to claim 1, wherein surface of the heat transfer tubes, has grooves, indentations or other surface modifications to enhance heat or mass transfer.

5. A method according to claim 1, wherein the heat transfer tubes are arranged in sections, with each section having independent flow rate, temperature and pressure control of the heat transfer fluids.

6. A method according to claim 1, wherein baffles are used to control the patterns of fluid flow in the open space outside of the heat transfer tubes.

7. A method according to claim 1, where a portion of the discharged liquid product is separated, pumped and recycled into the reactor at a single location or a plurality of locations to control the flow rates and compositions of the fluids on the outside of the heat transfer tubes.

8. A method according to claim 1, where a portion of the discharged gas product is separated, compressed and recycled into the reactor to control the flow rates and compositions of fluids on the outside of the heat transfer tubes.

9. A method according to claim 1, wherein the heat transfer tubes are a part of compact finned-tube heat exchanger.

10. A method according to claim 1, wherein the heat transfer tubes are a part of air conditioner condensers, Fin-Fan-.RTM. tube bundles or other types of tubular heat exchangers.

11. A method of converting synthesis gas into Fischer-Tropsch products, comprising: a. charging synthesis gas to an upper portion of a reactor comprising a shell, having an inlet nozzle near one end for receiving synthesis gas and an outlet nozzle near the opposite end for discharging products, with a plurality of heat transfer tubes inside the shell, having associated therewith means to pass heat transfer fluids through the inside of said heat transfer tubes to remove heat, and whereby the outside surfaces of said tubes have fins and said surfaces and fins have a layer of Fischer-Tropsch catalyst on outside surfaces thereof and, b. passing said synthesis gas down over and through, and converting exothermically on, said catalyst layer at least a portion of said synthesis gas to produce heat and Fischer-Tropsch products, c. removing heat by passage of a heat transfer fluid through said inside of said tubes,d. recovering Fischer-Tropsch normally liquid products from products discharged from said reactor, and e. recycling 0.5 to 50 wt % of said normally liquid Fischer-Tropsch products to a recycle liquid nozzle within said shell and near the top of said shell and spraying said Fischer-Tropsch recycle liquid product above said finned-tube heat exchanger.

12. The method of claim 11 wherein said catalyst comprises cobalt.

* * * * *